Figure 1:
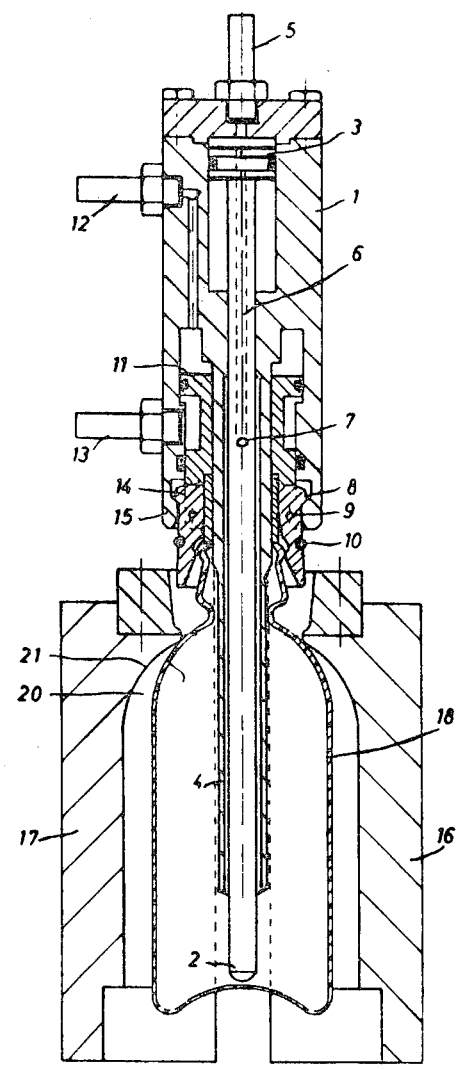

United States Patent [19]

Bodson et al.

[11] 4,131,665
[45] Dec. 26, 1978

[54] PROCESS FOR MOULD RELEASE OF HOLLOW PLASTIC BODIES MOULDED BY BLOWING BY MEANS OF A NOZZLE

[75] Inventors: Luc Bodson, Grez-Doiceau; Marc Obsomer; Edmond Michel, both of Brussels, all of Belgium

[73] Assignee: SOLVAY & Cie., Brussels, Belgium

[21] Appl. No.: 714,822

[22] Filed: Aug. 16, 1976

[30] Foreign Application Priority Data

Aug. 18, 1975 [FR] France .............................. 75 25715

[51] Int. Cl.² .......................................... B29C 17/07
[52] U.S. Cl. .................... 264/572; 264/334; 264/335; 425/537
[58] Field of Search ............... 264/89, 94, 97, 334, 264/335, 98, 99; 425/139, 387 B, DIG. 204, 232, 537

[56] References Cited

U.S. PATENT DOCUMENTS

| 2,789,312 | 4/1957 | Borer | 425/387 B X |
| 3,002,225 | 10/1961 | Goller | 425/387 B X |
| 3,183,292 | 5/1965 | Dvoracek | 264/335 |
| 3,616,491 | 11/1971 | Vollers | 425/387 B X |
| 3,664,798 | 5/1972 | Moslo | 425/387 B X |
| 3,817,678 | 6/1974 | Armour | 425/DIG. 232 |
| 3,989,786 | 11/1976 | Mehnert et al. | 264/334 X |

Primary Examiner—Jan H. Silbaugh
Attorney, Agent, or Firm—Spencer & Kaye

[57] ABSTRACT

Process for mould release of a hollow plastic body moulded by blowing by means of a nozzle in which after cooling the hollow body and opening the mould, a fluid under pressure is injected into the hollow body through the nozzle in the bottom region of the hollow body. The process may be completed by a mechanical ejector acting from the outside at the neck position of the hollow body after the nozzle has been removed from the mould.

7 Claims, 2 Drawing Figures

PROCESS FOR MOULD RELEASE OF HOLLOW PLASTIC BODIES MOULDED BY BLOWING BY MEANS OF A NOZZLE

The present invention relates to a process for mould release of hollow plastic bodies such as bottles and similar objects, moulded by blowing by means of a nozzle, as well as devices specially designed for carrying out the process.

Accordng to a known technique of blow-moulding, a preform or a portion of tubular parison of a hot thermoplastic is enclosed in a mould. A blowing nozzle is introduced into an open end of the preform or of the portion of parison intended to constitute the neck region of the desired hollow body. When preforms are blown, the neck portion can be moulded beforehand to its definitive shape. When tubular portions of parison are employed, the blowing nozzle can be so designed as to cause the shaping of the neck of the moulded hollow body during blowing.

After moulding, and cooling of the hollow body formed, the blowing nozzle can be withdrawn from the mould before opening the latter. In that case the hollow body can, during opening of the mould, inadvertently remain attached to one of the parts of the mould. Even if ejectors are employed, it is not possible to achieve in this way, in every case, a mould release which takes place at a precise instant or in a precise position.

According to another mould release technique, the nozzle is kept in place during the opening of the moulds. In that case, the moulded hollow body remains suspended from the blowing nozzle and its removal from the mould cavities should in principle not present any problem. However, in order to complete the mould release, it is necessary to remove the hollow body from the blowing nozzle. One of the known techniques for carrying out this operation consists of injecting a fluid under pressure into the hollow body through the blowing nozzle in the neck position. However, the excess pressure thus created cannot be too high without incurring the hazard of deformation of the hollow body. As a result, once again, it is difficult to ensure that the mould release operation takes place at the desired position and desired time, because the mould release operation is influenced by the greater or lesser adhesion which exists between the hollow body and the nozzle.

There has now been found, in accordance with the present invention, a technique for the mould release of hollow bodies obtained by blowing a preform or a portion of plastic tubular parison, and engaged on a blowing nozzle, which permits precision in respect of the time and position of the mould release operation.

The present invention thus relates to a process of mould release of plastic hollow bodies moulded by blowing by means of a nozzle and a mould in which, after cooling the hollow body and opening the mould, a fluid under pressure is injected through the nozzle into the hollow body, and in which the fluid under pressure is injected into the bottom region of the hollow body.

In this way, the jet of fluid, which preferably has a direction parallel to the nozzle and hence to the axis of the hollow body, strikes the hollow body in an impact zone situated at its bottom. The impact is the stronger, the nearer to the bottom of the hollow body the fluid is introduced. The jet of fluid immediately causes an axial shift of the hollow body relative to the nozzle and the separation of the hollow body and of the nozzle is practically instantaneous.

Preferably, the fluid under pressure is introduced into the hollow body in the lower half of the total height of the latter. The best results are obtained if the fluid is introduced at less than 5 cm, and preferably at less than 2 cm, said distance being defined as the minimum distance between the injection orifice or orifices and the nearest point of the bottom. Any fluid can be employed. It is preferred to use a gas such as carbon dioxide or nitrogen and, most frequently, air.

This process can easily be carried out by using a blowing nozzle of such length that it extends into the lower half of the hollow body, the injection orifice or orifices for the fluid under pressure being located at the end of the nozzle or near this end.

Obviously, the fluid under pressure is injected at an instant at which the mould is sufficiently open to allow the release of the hollow body.

According to a preferred embodiment, it is possible to make even more sure of the release of the hollow body from the blowing nozzle by causing a sliding member of the blowing nozzle, such as an internal piston or an external sleeve, to descend into the hollow body at the precise instant at which the fluid under pressure is injected. The descent of this member brings the end of the latter into contact with the bottom of the hollow body and pushes the body so as to remove it from the blowing nozzle.

In order to ensure with certainty that the injection of the fluid under pressure and the descent of the sliding member take place simultaneously, it is possible to control the descent of the member by means of the fluid under pressure. In that case, in effect, the fluid under pressure is injected into the hollow body so as simultaneously to ensure the movement of the member. To do this, it is preferred to use, as the sliding member, a piston located at the centre of the nozzle.

It is also possible to control these operations by any other means, such as cams, programmers and the like.

According to another embodiment, which can furthermore be used at the same time as the preceding embodiment, it is possible to use blow moulds which consist of two mould halves which can be separated, and a movable bottom portion. When the mould is opened, the bottom portion is removed and the two mould halves of the hollow body are separated by a distance less than the maximum diameter of the moulded hollow body.

If such moulds are used under the conditions specified, it is still possible to release the hollow body from the blowing nozzle, during the mould release sequence, in case of accidental non-functioning of the injection of fluid under pressure; the shoulders of the hollow body are held back, during the retraction of the nozzle, by the shoulders of the cavities of the two mould halves of the body, consequently resulting in certain extraction of the nozzle from the neck of the hollow body.

Hence it can be seen that the process according to the invention, and its supplementary embodiments, can guarantee separation of the blowing nozzle from the moulded hollow body at a very precise instant, and in a very precise position, which can both be determined by the operator.

However, it can happen that a preform or a portion of parison becomes pierced during blowing. Whilst being engaged on the blowing nozzle, this preform or portion of parison is not moulded during blowing.

In that case, the process described, and its various embodiments, can prove inoperative.

In fact, the injection of a fluid under pressure proves to be of very low effectiveness if a perforation is present. The descent of a sliding member is also erratic in its effects, because the material which has remained in the plastic state stretches or tears under the action of the sliding member. Finally, the retraction of the nozzle has no effect because the shoulders of the mould halves cannot retain the plastic.

Hence it is advantageous, in the process according to the invention, to provide the blowing nozzle with a mechanical ejector which acts on the hollow body from the outside. Its functioning is delayed relative to the instant at which fluid under pressure is injected into the hollow body and relative to the other disengagement operations of the blowing nozzle.

In this way, the release of the non-blown material is ensured and this extraction is carried out at an instant, or in a position, different from that at which the correctly moulded hollow bodies are released from the mould. This permits automatic separation of the hollow bodies which are ready to be used from the waste which must be recycled.

In order to carry out the process according to the invention in practice, specific devices have been developed which also form part of the scope of the invention.

Thus, in order to put the process into practice, a blow-mould apparatus has been produced which comprises at least one blowing nozzle which extends beyond the zone in which the neck of the hollow bodies to be produced is shaped and which preferably stops near the bottom of these hollow bodies, means being provided for injecting a fluid under pressure in the position of the end of the nozzle.

According to a first variant, the blowing nozzle can be equipped with an internal piston which slides in the nozzle, means being provided to cause the movement of this piston so that it exerts a pressure on the bottom of the hollow bodies moulded during the injection of the fluid under pressure.

According to a preferred embodiment, the signal which controls the movement of the said piston is dependent on the injection of the fluid under pressure through the blowing nozzle.

According to another embodiment the blow-moulding apparatus comprises at least one blow mould consisting of two separable mould halves for the body and a removable bottom portion, means being provided, during the opening of the moulds, for removing the bottom portion and separating the two separable mould halves by a distance less than the maximum diameter of the moulded hollow bodies.

Furthermore, means are provided for extracting the blowing nozzle from the moulds after the latter have been opened.

Finally, according to a last variant, the blowing nozzle is equipped with a mechanical ejector which acts, on the exterior of the hollow body, on the neck of the latter, such as an annular ring sliding around the nozzle. Means are provided to cause this ejector to function after the nozzle has been retracted from its blow mould.

The process according to the invention is furthermore explained in greater detail in the description of a practical embodiment which now follows. However, this example is of course given by way of illustration and without implying a limitation.

Figure 2:
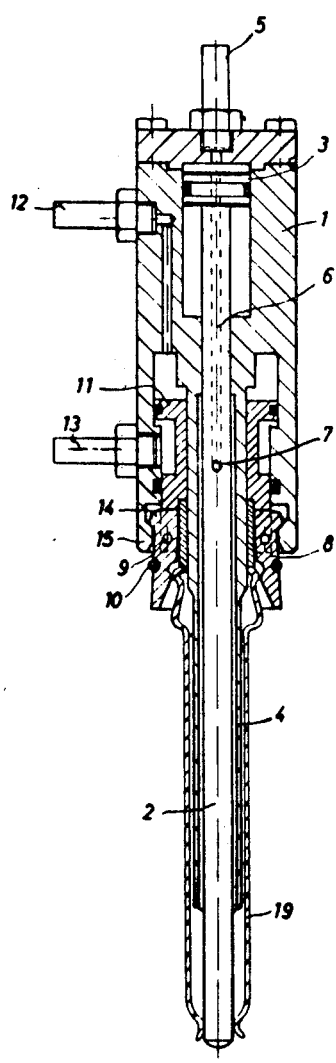

In this description, reference will be made to the Figures of the attached drawings, in which:

FIG. 1 is a cross-section of a blowing assembly comprising a blowing nozzle and a blow mould according to the invention, and FIG. 2 is a cross-section of the nozzle of FIG. 1, extracted from the blow mould.

In the attached Figures, the other members of the blowing apparatus, which are not necessary for a good understanding of the invention, have not been shown.

This apparatus is suitable for blowing preforms of which the bottom end is closed.

As can be seen from the Figures, the blowing nozzle 1 comprises a sliding internal piston 2 and a control cylinder 3 which controls the movements of this piston. The piston 2 is surrounded by a bush 4 up to near its end, the piston and the bush defining an annular chamber which can be connected to a source of fluid under pressure (which is not shown) via a tube 5, the control cylinder 3 and a pipeline 6 provided in the rear part of the piston 2 and opening into the annular chamber via radial channels 7. The blowing nozzle also comprises an expandable system for gripping preforms, consisting of series of members 8 which can pivot about axes 9 and are held in the closed position by an elastic ring 10. The gripper system can move along the nozzle under the action of the double-action pneumatic piston 11 connected to a fluid under pressure via the tubes 12 and 13 and control valves which are not shown.

The members 8 possess a shoulder 14 which, during the movements of the expandable system, can come into contact with the fixed shoulders 15 provided on the blowing nozzle.

The blow mould consists of two separable mould halves for the body, 16 and 17, and a removable bottom portion. In FIG. 1, the mould is represented in the open position and the removed bottom portion is not shown. It is seen that in the open position, the mould halves of the body, 16 and 17, are separated from one another by a distance less than the maximum diameter of the moulded hollow body 18.

The mode of operation of the device described is as follows, in respect of the mould release stage, which is the only stage concerned by the present invention.

After blowing and cooling the moulded hollow body 18, the mould is opened by removing the bottom portion and separating the mould halves for the body, 16 and 17, by a distance less than the maximum diameter of the moulded hollow body.

After opening the mould, the tube 5 is connected, by means which are not shown, to a source of fluid under pressure.

As a result, the fluid under pressure enters the chamber 3 and, via the channels 6 and 7, enters the annular space defined by the bush 4 and the piston 2. The fluid under pressure is then injected into the hollow body near its bottom and along a direction substantially at right angles to the latter:

The pressure exerted on the bottom of the hollow body causes this hollow body to move downwards and hence to be removed form the nozzle, against the action of the gripper device, and to fall between the two mould halves 16 and 17.

Furthermore, the fluid under pressure introduced into the chamber 3 at the same time exerts a pressure on the piston head 2 and causes the latter to descend. As a result, the end of the piston 2 comes into contact with the bottom of the hollow body 18 and pushes the latter downwards, thus collaborating with the fluid injected into the hollow body so as to ensure that the latter is released from the mould.

Furthermore, means which are not shown, such as pneumatic or hydraulic jacks, cause the upward movement of the whole of the blowing nozzle, relative to the mould.

At that stage, assuming that the two abovementioned means, namely injection of fluid under pressure and descent of the piston 2, have proved insufficient to release the hollow body from the blowing nozzle, the lifting of the nozzle has the effect of bringing the shoulder 20 of the hollow body into contact with the shoulder 21 of the moulds. Consequently, the hollow body cannot follow the blowing nozzle during its subsequent movement and the blowing nozzle is thus extracted from the neck of the hollow body. This safety measure proves useful in cases where the moulded hollow body has a defective bottom which is pierced by the piston 2 during its descent. The rise of the blowing nozzle can be delayed relative to the instant of injection of the fluid into the bush 5, which permits automatic separation of the hollow bodies released from the mould by these different means.

After the blowing nozzle has been lifted, a fluid under pressure is admitted into the nozzle through the tube 12 and causes the descent of the piston 11 and hence of the gripper assembly. During this movement, the shoulders 14 of the members 8 of the gripper assembly come up against the fixed shoulders 15 of the blowing nozzle and hence cause the opening of the gripper assembly by pivoting of the members 8 about the axes 9. Furthermore, the downward sliding movement of the gripper assembly causes the removal of any preform which may have remained on the blowing nozzle. This latter safety measure proves useful in cases where a preform 19 (FIG. 2) which has been pierced at the time at which it was blown fails to be moulded and hence escapes the preceding means of mould release.

The process according to the invention can be applied to hollow bodies moulded from preforms of which one end (the end which forms the bottom) is closed, or moulded from portions of tubular parison which are pinched in the bottom of the mould. It is particularly valuable to apply in cases of moulding plastic hollow bodies which have been biaxially oriented by biaxial stretching (radial and longitudinal). These hollow bodies are most frequently manufactured from preforms with a closed bottom and a neck, moulded to its definitive shape, the height of which is less than that of the definitive hollow body. In fact, it is customary practice in moulding these hollow bodies to use nozzles which extend towards the bottom of the hollow bodies.

The present invention thus permits the mould release of biaxially oriented bottles, such as those made from acrylonitrile copolymers, used in packaging beer and sparkling drinks.

We claim:

1. Process for mould release of a hollow plastic body which has been subjected to a blow moulding operation by means of a blowing nozzle and a mould having two mould halves and a removable bottom portion, for the purpose of moulding the body from an initial form into the form of a finished article of biaxially oriented material, the initial form being a preform having a closed base and a height which is less than that of the finished article, and in which, after cooling the hollow body and opening the mould, a fluid under pressure is injected into the hollow body through the nozzle comprising:
opening the mould by removing the removable bottom portion and separating the two mould halves for the body by a distance which, at the top of the mould halves, is les than the maximum diameter of a properly blown moulded hollow body,
thereafter injecting the fluid under pressure into the bottom region of the hollow body with a pressure which normally is sufficient to cause release of a properly blown moulded hollow body from the mould;
after the injection of the fluid under pressure into the hollow body, removing the blowing nozzle from the mould by retraction so that if a moulded hollow body is still on the nozzle during the retraction, the moulded hollow body will be held back during the retraction by the two mould halves resulting in extraction of the nozzle from the neck of the hollow body and release of the moulded hollow body from the mould,
after the removing of the blowing nozzle by retraction, operating an ejector which acts from the outside at the neck position of the hollow body, said ejector releasing the hollow body if the hollow body is incompletely blown and has not as yet been released.

2. Process according to claim 1, wherein the fluid under pressure is injected into the hollow body at a distance from the bottom less than half the total height of the hollow body.

3. Process according to claim 1, wherein the fluid under pressure is injected into the hollow body at a distance from the bottom of less than 5 cm.

4. Process according to claim 1 wherein, the fluid under pressure is injected along a direction parallel to the nozzle.

5. Process according to claim 1 wherein, at the instant at which the fluid under pressure is injected into the hollow body, a sliding member of the blowing nozzle is caused to descend into the hollow body in such a way that its end exerts a pressure on the bottom of the hollow body.

6. Process according to claim 5, wherein the descent of the sliding member is controlled by the fluid under pressure injected into the hollow body.

7. Process according to claim 5 wherein, the sliding member is a piston placed at the centre of the nozzle.

* * * * *